US008387066B1

(12) United States Patent
Becher et al.

(10) Patent No.: US 8,387,066 B1
(45) Date of Patent: Feb. 26, 2013

(54) DEPENDENCY-BASED TASK MANAGEMENT USING SET OF PRECONDITIONS TO GENERATE SCHEDULING DATA STRUCTURE IN STORAGE AREA NETWORK

(75) Inventors: Andrew S. Becher, Rochester, MN (US); Evgeny Roytman, Sharon, MA (US); Michael G. Hegerich, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 1457 days.

(21) Appl. No.: 11/863,780

(22) Filed: Sep. 28, 2007

(51) Int. Cl.
G06F 9/46 (2006.01)

(52) U.S. Cl. ........ 718/106; 718/100; 718/102; 718/103; 709/223

(58) Field of Classification Search .................. 718/100, 718/102, 103, 106; 709/223
See application file for complete search history.

(56) References Cited

U.S. PATENT DOCUMENTS

| | | | | |
|---|---|---|---|---|
| 5,392,430 A | * | 2/1995 | Chen et al. | 718/102 |
| 6,078,745 A | * | 6/2000 | De Greef et al. | 717/151 |
| 6,920,632 B2 | * | 7/2005 | Donovan et al. | 718/103 |
| 7,093,259 B2 | * | 8/2006 | Pulsipher et al. | 718/106 |
| 7,506,040 B1 | * | 3/2009 | Rabe et al. | 709/223 |
| 7,836,448 B1 | * | 11/2010 | Farizon et al. | 718/100 |
| 7,881,946 B1 | * | 2/2011 | Yehuda et al. | 705/1.1 |
| 2003/0120701 A1 | * | 6/2003 | Pulsipher et al. | 709/102 |
| 2003/0120708 A1 | * | 6/2003 | Pulsipher et al. | 709/106 |
| 2003/0120709 A1 | * | 6/2003 | Pulsipher et al. | 709/106 |
| 2004/0044744 A1 | * | 3/2004 | Grosner et al. | 709/217 |
| 2005/0066225 A1 | * | 3/2005 | Rowan et al. | 714/5 |
| 2006/0212719 A1 | * | 9/2006 | Miyawaki et al. | 713/189 |
| 2006/0218558 A1 | * | 9/2006 | Torii et al. | 718/107 |

* cited by examiner

*Primary Examiner* — Meng An
*Assistant Examiner* — Abu Z Ghaffari
(74) *Attorney, Agent, or Firm* — Krishnendu Gupta; Gerald P. Kazanjian (57) ABSTRACT

In a storage area network, a task manager identifies a set of preconditions for execution of storage management tasks. The set of preconditions establish dependencies between tasks in the storage area network. Execution of the tasks is contingent upon satisfaction of the set of preconditions. In addition, the task manager generates a scheduling data structure based on the set of preconditions in order to schedule execution of the tasks. As a result, the task manager can utilize the scheduling data structure to optimize task execution in the storage area network (e.g., by applying a task optimization algorithm). Such optimization minimizes resource consumption (e.g., thread allocation, processor time commitment, etc.) in the storage area network during execution of the tasks.

17 Claims, 9 Drawing Sheets

DEPENDENCY-BASED TASK MANAGEMENT USING SET OF PRECONDITIONS TO GENERATE SCHEDULING DATA STRUCTURE IN STORAGE AREA NETWORK

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

SUMMARY

Conventional storage area network management applications such as those discussed above may suffer from a number of drawbacks. For example, such conventional storage area network management applications execute tasks in order to perform application specific functions. These tasks are configured in an execution hierarchy to ensure appropriate execution ordering. In this manner, such conventional applications implement an execution strategy to configure and schedule tasks for either sequential (e.g., serial) and/or simultaneous (e.g., parallel) execution in the storage area network according to the execution hierarchy. However, the use of an execution strategy requires certain tasks (e.g., composite tasks) in the hierarchy to perform procedural or scheduling functions rather than performing application specific functions. As a result, such conventional applications and methods are inflexible and do not allow for task hierarchies to be represented in a natural manner. And in addition to creating the application specific tasks, application programmers and SAN administrators are also burdened with the responsibility of creating composite tasks and determining appropriate execution strategies for carrying out those tasks.

Techniques discussed herein deviate with respect to conventional applications such as those discussed above as well as techniques known in the prior art. For example, embodiments herein provide a novel and useful way for representing and executing application specific tasks in a storage area network according to dependencies that may exist between those tasks. Such a dependency-based model allows network programmers and administrators to create application specific tasks without having to additionally create composite tasks and associated execution strategies. By enabling a programmer to assert dependencies (e.g., in the form of preconditions) among tasks, a more natural approach is provided for creating task execution hierarchies.

For example, the execution of a first task may depend upon the completion of a second task and the completion of a third task. In other words, the first task has at least two preconditions for execution which are i) the completed execution of the second task; and, ii) the completed execution of the third task. In using conventional methods, a composite task and associated execution strategy would have to be created in order to ensure that the first task does not execute until the second and third tasks have completed execution. In contrast, embodiments herein provide a task manager that would enable a programmer or administrator to simply define the dependencies between the first, second and third tasks without having to generate a composite task and associated execution strategy.

According to an example embodiment, the task manager parses or traverses the user-defined dependencies to generate a scheduling data structure. The scheduling data structure outlines the order for task execution and provides a thread allocation mapping for each task. In using the previous example, a scheduling data structure would assign the second and third tasks to a first time period or step (e.g., assuming that tasks complete execution in a single time period or step). Since no interdependencies exist between the second and third tasks, both tasks may execute simultaneously such that a processing thread is allocated to each task for parallel execution. The scheduling data structure would further assign the first task to a second time period or step that follows the first time period. Note that the first task is assigned to a later time period since its execution depends upon the prior completion of the second and third tasks. Accordingly, it should be appreciated that embodiments described herein relieve an application programmer or administrator from having to determine such task execution ordering (e.g., sequential execution vis-à-vis simultaneous execution of tasks) and thread allocation when creating a bloc of interdependent tasks.

More specifically, in one embodiment, a task manager identifies preconditions necessary for executing tasks in a storage area network. In this manner, the set of preconditions establishes dependencies between the tasks in the storage area network. Thus, execution of a task is contingent upon satisfaction of a set of preconditions attributed to that task. Typically, one such precondition requires the completion of another task in the storage area network before execution of the preconditioned task can begin.

After identifying the preconditions associated with a task, the task manager generates a scheduling data structure based on the set of preconditions in order to schedule execution of the plurality of tasks. The task manager can then optimize task execution (e.g., via a task optimization algorithm) based on the scheduling data structure to minimize resource consumption (e.g., thread allocation) in the storage area network during the execution of tasks.

In one embodiment, the task manager generates the scheduling data structure so that each task has (i) an associated time period for execution in the storage area network in accordance with the established dependencies between each task, and (ii) for each task's respective time period, an associated thread allocation enabling simultaneous execution of tasks and their respective threads for a given number of available threads in the storage area network. Generally, simultaneous execution of tasks occurs among tasks that do not have any interdependencies. The time period can also be represented as a specific 'step' in the ordering of the task execution.

Additional embodiments include the task manager evaluating the scheduling data structure to optimize task execution in the storage area network (e.g., by applying a task optimization algorithm). Optimization is achieved when execution of tasks according to the scheduling data structure can be completed with a minimum amount of time periods and thread allocations.

Embodiments described herein also enable generation of task dependencies in a graphical user interface (e.g., as a task dependency graph). In such a configuration, tasks are represented as separate entities that occupy non-overlapping task regions in the graphical user interface. A precondition between two tasks can be generated by graphically connecting the respective task regions with a unidirectional indicator (e.g., an arrow).

In addition to the embodiments discussed above, other embodiments herein include a computerized device (e.g., a host computer, workstation, etc.) configured to support the techniques disclosed herein such as management of tasks and their execution. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports task management and execution according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support task management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate execution of tasks and/or use of multiple processing threads. The instructions and their corresponding execution support operations of: i) identifying a set of preconditions for execution of a plurality of tasks; ii) generating a scheduling data structure based on the set of preconditions in order to schedule execution of the plurality of tasks; and iii) optimizing task execution based on the scheduling data structure.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

Techniques herein are well suited for use in applications such as those supporting task management in a storage area network environment. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a task manager and related functions for representing and executing application specific tasks in a storage area network according to task dependencies (e.g., execution of a first task is dependent upon completion of a second task). Generally, a task is an atomically executable set of instructions (e.g., cannot be interrupted by another task while executing) created for performing a specific function to achieve a specific result. Such a dependency-driven model allows application programmers and administrators to create application specific tasks without having to additionally create composite tasks and associated execution strategies. The task manager enables a storage area network programmer or administrator to merely define the dependencies between tasks. Thus, embodiments herein obviate the need for a user to predefine sequential (e.g., serial) and/or simultaneous (e.g., parallel) task scheduling via an execution strategy.

In an example embodiment, the task manager evaluates the user-defined dependencies (e.g., preconditions) to generate a scheduling data structure. The scheduling data structure defines the ordering for task execution and allocates processing threads for each task. With this information, the task manager can optimize task execution in order to increase efficiency and minimize use of system resources in the storage area network.

Figure 1:
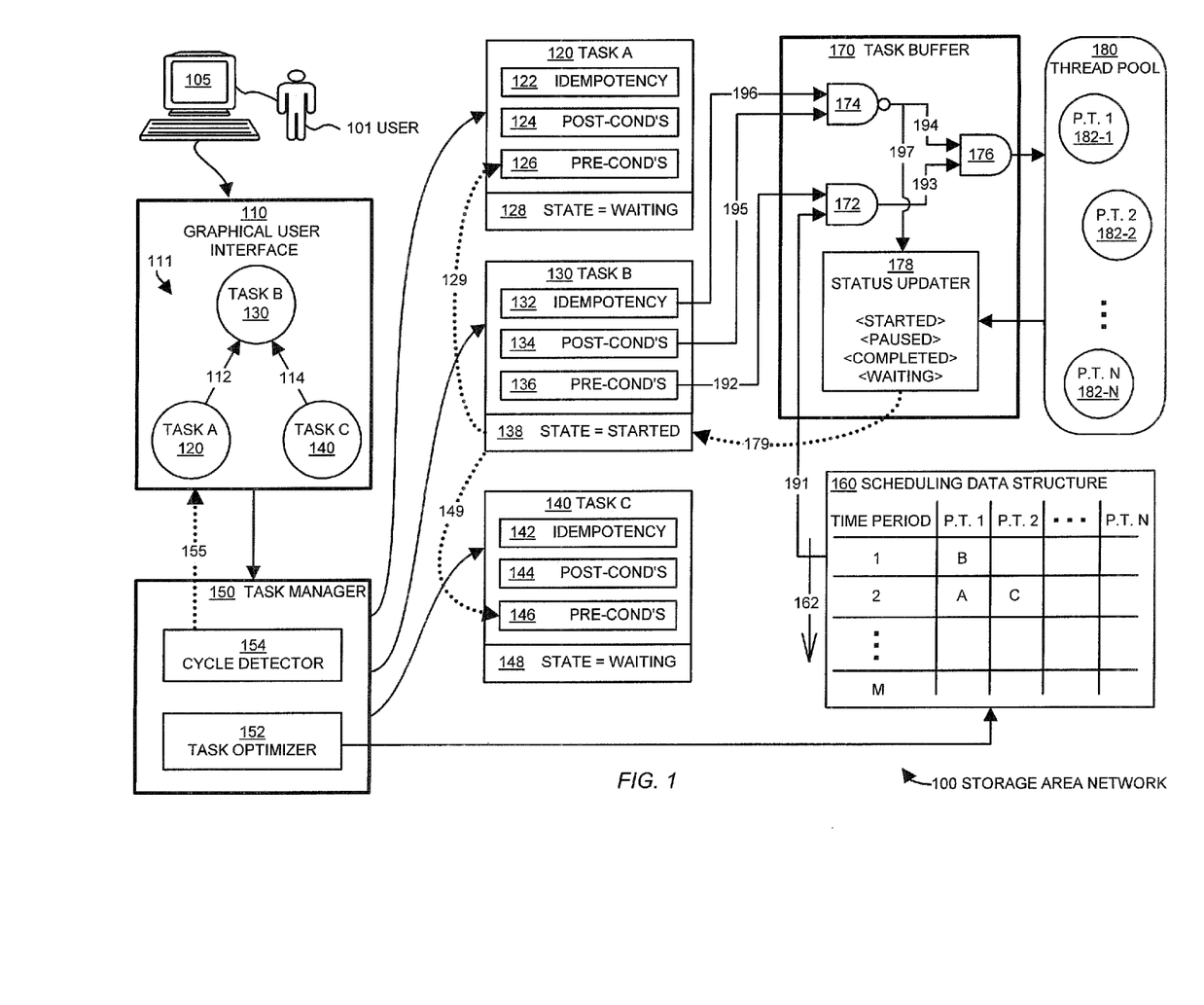
FIG. 1 is an example diagram illustrating a storage area network environment for scheduling and executing tasks based on dependency relationships according to embodiments herein.

Now, more specifically, FIG. 1 is an example diagram illustrating a storage area network 100 for scheduling and executing tasks based on dependency relationships according to embodiments herein. The storage area network 100 includes a user 101 (e.g., application programmer, storage area network administrator, etc.) that interacts with computer system 105 (e.g., workstation, terminal, personal computer, laptop, etc.) and associated graphical user interface 110.

Task_A 120, Task_B 130 and Task_C 140 and associated dependencies 112, 114 reside in a task manager 150. The computer system 105, via task manager 150, renders Task_A 120, Task_B 130 and Task_C 140 and associated dependencies 112, 114 as a dependency graph 111 in graphical user interface 110. As shown, dependency 112 requires that execution of Task_A 120 is dependent upon completion of Task_B 130, while dependency 114 requires that execution of Task_C 140 is also dependent upon completion of Task_B 130.

The task manager 150 includes a task optimizer 152 and a cycle detector 154 according to one example embodiment. During operation, the task manager 150 processes the tasks and their respective dependencies to identify preconditions for each task. For example, Task_A 120 has associated preconditions 126, Task_B 130 has associated preconditions 136, and Task_C 140 has associated preconditions 146. Likewise, the task manager 150 identifies post-conditions associated with each task. As shown in FIG. 1, Task_A 120 has associated post-conditions 124, Task_B 130 has associated post-conditions 134, and Task_C 140 has associated post-conditions 144.

It should be noted that, as depicted in FIG. 1, the preconditions 126, 136 and 146, and post-conditions 124, 134 and 136 being defined within the task objects represent only one example embodiment. As will be discussed in more detail with respect to FIGS. 2 and 3, preconditions and post-conditions may also be defined as separate classes and instantiated as separate objects by the task manager 150 (according to an object-oriented framework).

The task manager 150 also identifies an idempotency attribute associated with each task. For instance, Task_A has associated idempotency attribute 122, Task_B 130 has associated idempotency attribute 132, and Task_C has associated idempotency attribute 142. In one embodiment, the idempotency attribute is a Boolean value represented either as true (e.g., the task is idempotent) or as false (e.g., the task is not idempotent). Moreover, each task has an associated state (e.g., waiting, started, paused, resumed, completed, failed, etc.). As shown in FIG. 1, Task_A 120 has an associated state 128 (e.g., waiting), Task_B has an associated state 138 (e.g., started), and Task_C has an associated state 148 (e.g., waiting).

Note that the task optimizer 152, as part of the task manager 150, generates a scheduling data structure 160. The scheduling data structure 160 in FIG. 1 depicts the tasks organized in a table format with "time period" rows (e.g., time periods 1, 2, . . . , M) and "processing thread" columns (e.g., processing threads 182-1, 182-2, . . . , 182-N). A sequencing indicator 162 shows that task execution incrementally progresses from time period 1 to time period 2 through time period M, and so on. Note that the task optimizer 152 can apply at least one task optimization algorithm to the scheduling data structure in order to improve system performance and efficiency, as will be discussed in further detail below.

Still referring to FIG. 1, a task buffer 170 includes software logic 172, 174 and 176 for scheduling tasks and assigning threads. Task buffer 170 further includes a status updater 178. The task buffer 170 interacts with thread pool 180 containing processing threads 182-1, 182-2, . . . , 182-N.

According to one embodiment, the user 101 specifies tasks to be executed in the storage area network 100 via computer system 105 and graphical user interface 110. Such user-defined dependencies dictate how the tasks are scheduled and executed in the storage area network 100.

More specifically, the user 101 creates dependency graph 111 by generating dependencies 112 and 114 between Task_B 130 and Task_A 120, and Task_B 130 and Task_C 140, respectively, in graphical user interface 110. In this manner, Task_A 120, Task_B 130 and Task_C 140 are represented as separate entities occupying non-overlapping task regions in the graphical user interface 100. Note that each task circle in graphical user interface 110 represents a non-overlapping task region. Thus, user 101 can generate the dependencies 112 and 114 (e.g., preconditions) by graphically connecting the respective task regions with a unidirectional indicator (e.g., arrow). For example, a user can draw a line or arrow between two task regions in the graphical user interface 110 via an input device such as a mouse.

Referring again to FIG. 1, task manager 150 parses or traverses the dependency graph 111 in graphical user interface 110 to identify preconditions, if any, associated with each task. For example, preconditions 126 associated with Task_A 120 require that execution of Task_B 130 must be completed before Task_A 120 can begin execution. Likewise, preconditions 146 associated with Task_C 140 require that execution of Task_B 130 must be completed before Task_C 140 can begin execution. Note that the set of preconditions 136 associated with Task_B 130 is null since execution of Task_B 130 is not dependent upon completion of another task.

In the context of this example, note that preconditions 126 and 146 for Task_A 120 and Task_C 140, respectively, can perform queries 129, 149 on the state 138 associated with Task_B 130 in order to determine whether Task_B 130 has completed execution and, thus, satisfied the preconditions.

In another embodiment, task manager 150 identifies post-conditions associated with each task (e.g., post-conditions 124, 134 and 144). Post-conditions can be used to provide support for "idempotent" tasks. A task is considered idempotent when execution of that task always achieves the same result, regardless of any previous state. For example, a task called TurnPortOnline will always result in a respective port being placed online, whether or not that port is already online prior to execution of the task. Execution of such a task can be avoided by first checking the task post-conditions (e.g., port=online? or, is the port online?). If the post-conditions are true (e.g., satisfied), and the task is deemed idempotent, then execution of the task can be bypassed. In other words, post-conditions provide a means for testing whether execution of a task is necessary given the current state of the system. Details of such processing will be discussed further below with respect to software logic 174 and 176 and also in reference to FIG. 2.

Recall that in FIG. 1 task manager 150 generates a scheduling data structure 160 via task optimizer 152 in accordance with the preconditions associated with each task. As briefly mentioned before, Task_A 120 and Task_C 140 both depend from Task_B 130. Thus, neither Task_A 120 nor Task_C 140 can begin execution until Task_B 130 has completed its execution. Scheduling data structure 160 reflects this dependency relationship by scheduling Task_B 130 in the first time period and scheduling Task_A 120 and Task_C 140 in the second time period (e.g., step).

Note that Task_A 120 and Task_C 140 are scheduled for simultaneous execution in the second time period of scheduling data structure 160 since no dependencies exist between either task. Therefore, task optimizer 152 has allocated processing thread 182-1 for execution of Task_A 120 and processing thread 182-2 for execution of Task_C 140. Note that it is not necessarily required for Task_A 120 and Task_C 140 to be executed simultaneously (e.g., in parallel). Instead, for instance, if only a single thread is available for allocation, then Task_A 120 and Task_C would be executed sequentially, order notwithstanding (e.g., Task_B→Task_A→Task_C, or, Task_B→Task_C→Task_A).

As its name suggests, the task optimizer 152 optimizes execution of the tasks by minimizing utilization of system resources (e.g., processor time commitment and processing threads). Optimization can depend upon several variables such as, for example, the number of available processing threads in thread pool 180, variances in execution time for different threads, availability of memory, etc. In one embodiment, the task optimizer 152 applies at least one task optimization algorithm to the scheduling data structure 160 in order to increase system performance and efficiency while reducing consumption of system resources.

According to one embodiment, task buffer 170 queues and submits tasks for execution according to the scheduling data structure 160. The task buffer can use software logic 172, 174 and 176 to verify that all conditions are satisfied before a task is submitted for execution with a thread from the thread pool 180. For purposes of example, software logic 172 performs a software "AND" operation on input 191 and input 192 such that both inputs must be true in order for its output 193 to be true. Similarly, software logic 176 performs a software "AND" operation on input 193 and input 194 such that both inputs must be true in order for its output 193 to be true. In contrast, software logic 174 performs a software "NAND" operation (e.g., not AND) on inputs 195 and input 196 such that its output 194 is false if and only if both inputs are true.

It should be noted that the example configuration of software logic 172, 174 and 174 is for illustrative purposes only and can be represented in other similar configurations suitable for performing software operations in accordance with embodiments disclosed herein.

In one example embodiment, software logic 172 determines for a given task, i) whether the task is scheduled for execution during the current time period according to the scheduling data structure 180 (e.g., input 191 is TRUE if this condition is satisfied); and ii) whether the preconditions associated with the task have been satisfied (e.g., input 192 is TRUE if the preconditions are satisfied). Thus, if both inputs 191 and 192 are true, then output 193 will be true. In other words, software logic 172 establishes a rule that a given task will not be executed unless the task has been scheduled for execution during the current time period AND the preconditions associated with that task have been satisfied.

In another example embodiment, software logic 174 determines for a given task, i) whether the task is idempotent (e.g., input 196 is TRUE if the task is idempotent); and ii) whether the post-conditions associated with the task have been satisfied (e.g., input 195 is TRUE if the post-conditions are satisfied). Thus, unless input 195 and 196 are both true, output 194 will always be true. Stated differently, software logic 174 establishes a rule that execution of a given task will be bypassed if the task is both idempotent and the post-conditions associated with that task have been satisfied (even if the preconditions have been satisfied).

In yet another example embodiment, software logic 176 takes as input the output for software logic 172 and 174 (e.g., output/input 193 and output/input 194, respectively). More specifically, if input 194 from software logic 174 is false (e.g., idempotent=true AND post-conditions=true), then execution of a task scheduled for execution (and having all preconditions satisfied) will be bypassed. As a result, software logic 176 provides a mechanism for avoiding execution of unnecessary tasks. Such a mechanism can limit resource consumption (e.g., processor time, thread allocation, etc.) and improves system performance.

It should be noted that for purposes of clarity the software logic 172, 174 and 176 are shown only with respect to Task_B 130 and that the functionality of the software logic can be applied to each task (e.g., Task_A 120 and Task_C 140) in the storage area network 100 in the same manner as previously described. Thus, each task in the storage area network 100 is subject to satisfying the conditional requirements as provided by the software logic (e.g., preconditions, post-conditions, etc.) prior to execution of that task.

Referring still to FIG. 1, the status updater 178 updates execution state for each task upon the occurrence of an event (e.g., task completed, task paused, task resumed, task bypassed, etc.). As an example, assume that, prior to execution, state 138 for Task_B 130 is set to a "waiting" state. Further assume that preconditions 136 for Task_B 130 have been satisfied and that Task_B 130 is not idempotent such that the software logic submits Task_B 130 for execution by procession thread 182-1. Upon starting execution of Task_B 130, the status updater 178 updates the state 138 to reflect that Task_B has begun execution (e.g., STATE=STARTED).

Additionally, if execution of a task is bypassed because the task is idempotent and its post-conditions have been satisfied, the status updater 178 updates that task's state to "completed", even though the task never executed (e.g., represented by output 197 from software logic 174). This particular example is represented in FIG. 1 by output 197 of software logic 174. Alternatively, in such a scenario the status updater 178 can also provide a "bypassed" or similar status indicator.

It should be noted that although the status updater 178 has been shown in FIG. 1 and described so far as a separate logical entity from the task objects, the tasks themselves may also have internal mechanisms for updating status and a separate status updater is not necessarily required for implementation of embodiments described herein.

Cycle detector 154 detects whether the task graph 111 contains a cyclic dependency. A cyclic dependency exists when the execution of a task is dependent upon the completion of itself. If a cyclic dependency is detected within the task graph 111, the cycle detector 154 produces an error notification 155. In one embodiment, the task manager 150 (e.g., via cycle detector 154) renders an error notification message on graphical user interface 110 to indicate the detection of a cyclic dependency and which task(s) are the cause of the cycle.

Figure 2:
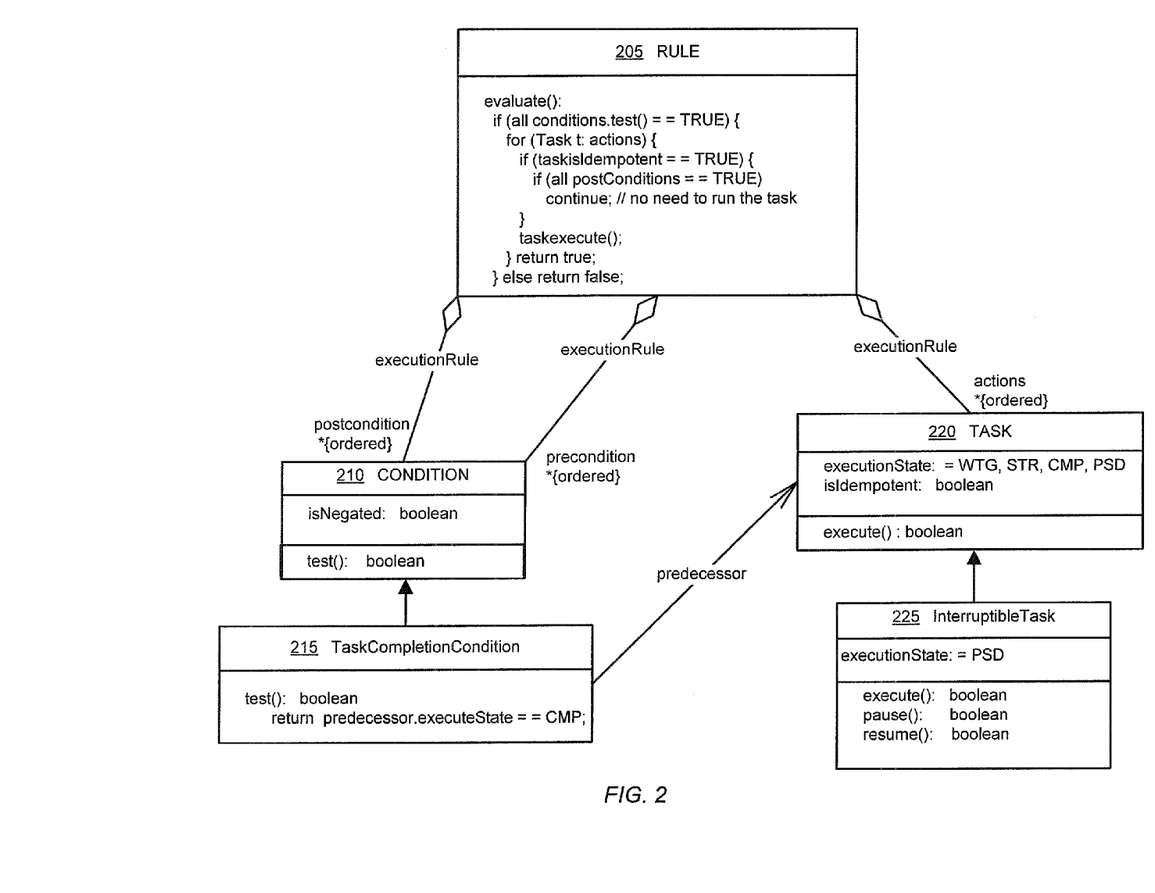
FIG. 2 is an example diagram illustrating the relationship between various task management objects according to embodiments herein.

FIG. 2 is an example diagram illustrating the relationship between various task management classes in a storage area network. The example embodiment in FIG. 2 represents one way to implement a dependency-based task execution model in accordance with embodiments herein. More specifically, FIG. 2 shows three class types: Rule class 205, Condition class 210, and Task class 220.

The Rule class 205 represents a statement of the form "if <conditions> are true, then perform <actions>". The Rule class 205 performs operations similar to the software logic as previously discussed in reference to FIG. 1. Note that the example pseudo-code in the Rule class 205 first determines whether preconditions were satisfied. If so, the Rule class 205 then determines whether the task is idempotent and further if the post-conditions have been satisfied. If the task is idempotent and the post-conditions have been satisfied, then execution of the task is bypassed. Otherwise, the task begins execution.

The Condition class 210 (e.g., preconditions and post-conditions) balances the need for full predicate calculus and the desire to maintain ease-of-use. Therefore, rather than defining an expression syntax (e.g., as in C++) where one might write an expression such as: ((task.executionStatus==CMP) && (hostname!="losbe142"||"losak149"), the Condition class 210 provides for the creation of different types of conditions and allows terms to be encapsulated within the object. In this manner, each Condition can be tested as being either true or false.

The TaskCompletionCondition class 215 is a subclass of the Condition class 210. In this subclass, a method TaskCompletionCondition.evalute( ) is provided and can check the execution status of its predecessor task (e.g., Task_B 130 is a predecessor task to Task_A 120 and Task_C 140). If the predecessor task has completed, the method returns a true value. In its operation, the task manager 150 can utilize the TaskCompletionCondition class 215 to test whether a precondition has been satisfied for a task and its respective predecessor task.

In a manner similar to the Condition class 210, the Task class 220 strikes a balance between providing support for flow control statements that might be found in a language and providing enough actions in an easy-to-use fashion. Tasks can be defined to do many different things such as, for example, calling operations, changing properties, deleting objects, etc.

The InterruptibleTask class 225 is a subclass of the Task class 220 and enables non-atomic execution of tasks. Note that the InterruptibleTask class 225 comprises methods for pausing and resuming a task once that task has already begun execution.

Figure 3:
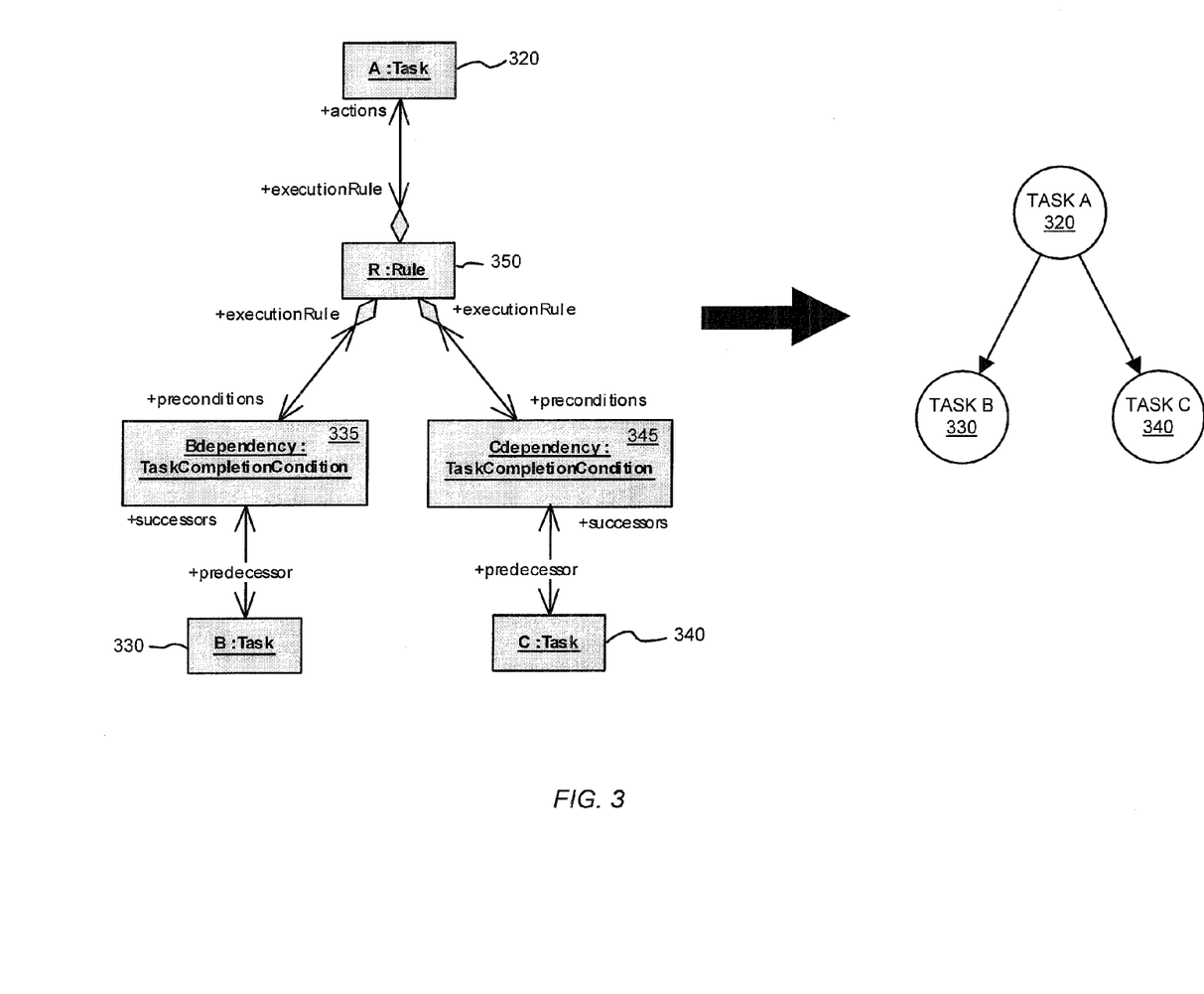
FIG. 3 is an example diagram illustrating dependency-based task management processing according to embodiments herein.

FIG. 3 is an example diagram illustrating dependency-based task management processing according to embodiments herein. In particular, FIG. 3 shows an example configuration for how the task manager 150 traverses a task dependency graph consisting of Rule class 205 objects, Condition class 210 objects and Task class 220 objects.

The left side of FIG. 3 shows a task dependency graph where a Task_A 320 depends on completion of a Task_B 330 and completion of a Task_C 340 (e.g., Task_B and Task_C are predecessor tasks to Task_A). Note that Task_B 330 is associated with TaskCompletionCondition 335 and Task_C 340 is associated with TaskCompletionCondition 345. Task_A 320 has an execution rule Rule 350 which requires that Task_A 320 cannot be executed until both TaskCompletionCondition 335 and TaskCompletionCondition 345 have each returned 'true' values (e.g., Task_B and Task_C have completed execution).

In this example configuration, the dependency arcs are formed by traversing the TaskCompletionCondition class 215 and Rule class 205 objects. By following the object relationships, the task manager 150 creates the high-level dependency graph shown on the right side of FIG. 3. The arcs <A, B> and <A, C> in the graph on the right can be traversed as follows:

for (TaskCompletionCondition p:A.executionRule.preconditions)

Task t=p.predecessor; //$1^{st}$ time t=B, $2^{nd}$ time t=C

It should be noted that the pseudo-code immediately above shows a simplified example of a dependency traversal. Further note that such an example would not work if Rule 350 were to have any conditions that are not of type TaskCompletionCondition.

Figure 4:
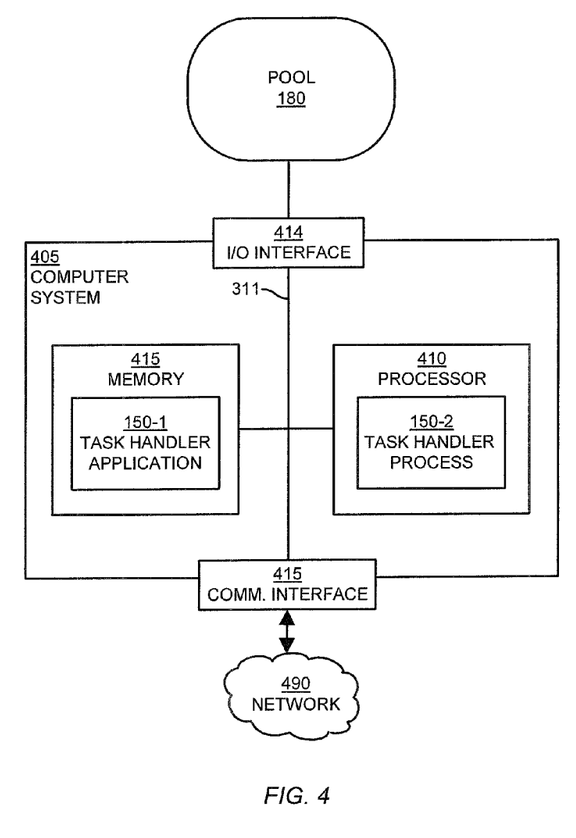
FIG. 4 is an example block diagram of a processing device suitable for executing a respective task manager and related functions according to embodiments herein.

FIG. 4 is a block diagram illustrating an example computer system 405 for executing task manager 150 and related functions/processes according to embodiments herein. Computer system 405 may be a computerized device such as a personal computer, workstation, portable computing device, console, network terminal, processing device, etc.

As shown, computer system 405 of the present example includes an interconnect 411 that couples a memory system 415, a processor 410, an I/O interface 414, and a communications interface 415. I/O interface 414 enables computer system 405 to submit tasks (or portions thereof) for execution by thread pool 180. Communications interface 415 of computer system 405 enables computer system 405 to communicate over network 490 to transmit and receive information from different resources as is needed to carry out task management according to embodiments herein.

As shown, memory system 415 is encoded with a task manager application 150-1 supporting dependency-based task execution as well as generation of graphical user interface and other functions according to embodiments herein. Task manager application 150-1 can be embodied as software code such as data and/or logic instructions (e.g., code stored in the memory or on another computer readable medium such as a disk) that support functionality according to different embodiments described herein.

Note that other functionality associated with task manager 150 such as task buffer 170 (and related software logic 172, 174 and 176) as described herein also can be encoded as software that operates on a computer system 405 to carry out embodiments herein.

Referring again to the task manager 150 example, during operation of task manager application 150-1, processor 410 accesses memory system 415 via the interconnect 411 in order to launch, run, execute, interpret or otherwise perform the logic instructions of the task manager application 150-1. Execution of the task manager application 150-1 produces processing functionality in task manager process 150-2. In other words, the task manager process 150-2 represents one or more portions of the task manager application 150-1 (or the entire application) performing within or upon the processor 410 in the computer system 405.

It should be noted that task manager process 150-2 executed in computer system 405 can be represented by either one or both of the task manager application 150-1 and/or the task manager process 150-2. For purposes of this discussion and different embodiments herein, general reference will again be made to the task manager 150 as performing or supporting the various steps and functional operations as previously discussed and as will be discussed further in this specification.

As mentioned, in addition to the task manager process 150-2, embodiments herein include the task manager application 150-1 itself (i.e., the un-executed or non-performing logic instructions and/or data). The task manager application 150-1 may be stored on a computer readable medium such as a floppy disk, hard disk, or optical medium. The task manager application 150-1 may also be stored in a memory type system such as in firmware, read only memory (ROM), or, as in this example, as executable code within the memory system 415 (e.g., within Random Access Memory or RAM). In addition to these embodiments, it should also be noted that other embodiments herein include the execution of task manager application 150-1 in processor 410 as the task manager process 150-2. Thus, those skilled in the art will understand that the computer system 405 may include other processes and/or software and hardware components, such as an operating system that controls reservation and use of hardware resources.

Functionality supported by task manager 150 and other resources will now be discussed via flowcharts in FIGS. 5-9.

Figure 5:
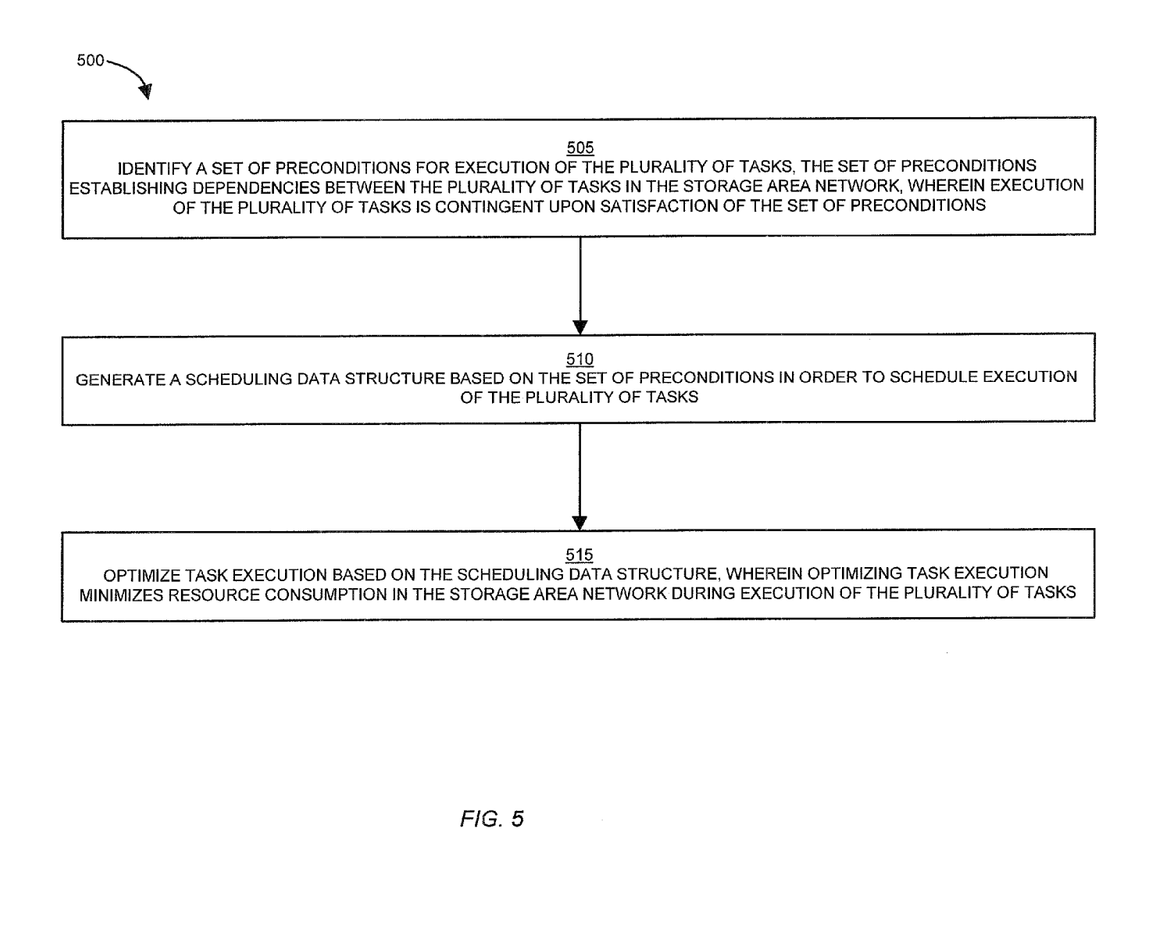
FIGS. 5-9 are example flowcharts illustrating management of executing tasks according to embodiments herein.

Now, more particularly, FIG. 5 is a flowchart 500 illustrating a technique of task management and execution according to embodiments herein. Note that techniques discussed in flowchart 500 may overlap with the techniques discussed above.

In step 505, the task manager 150 identifies a set of preconditions for execution of the plurality of tasks. As previously discussed, the set of preconditions establish dependencies between the plurality of tasks in the storage area network such that execution of the plurality of tasks is contingent upon satisfaction of the set of preconditions.

For example, in one embodiment the task manager enables generation of task dependencies in a graphical user interface. In this manner, tasks are represented as separate entities that occupy non-overlapping task regions in the graphical user interface. Additionally, a user can generate a precondition between two tasks by graphically connecting the respective task regions with a unidirectional indicator (e.g., arrow).

In step 510, the task manager 150 generates a scheduling data structure based on the set of preconditions in order to schedule execution of the plurality of tasks.

In step 515, the task manager 150 optimizes task execution based on the scheduling data structure. In this manner, optimizing task execution can minimize resource consumption (e.g., processor time commitment, number of processing threads, etc.) in the storage area network during execution of the plurality of tasks.

Figure 6:
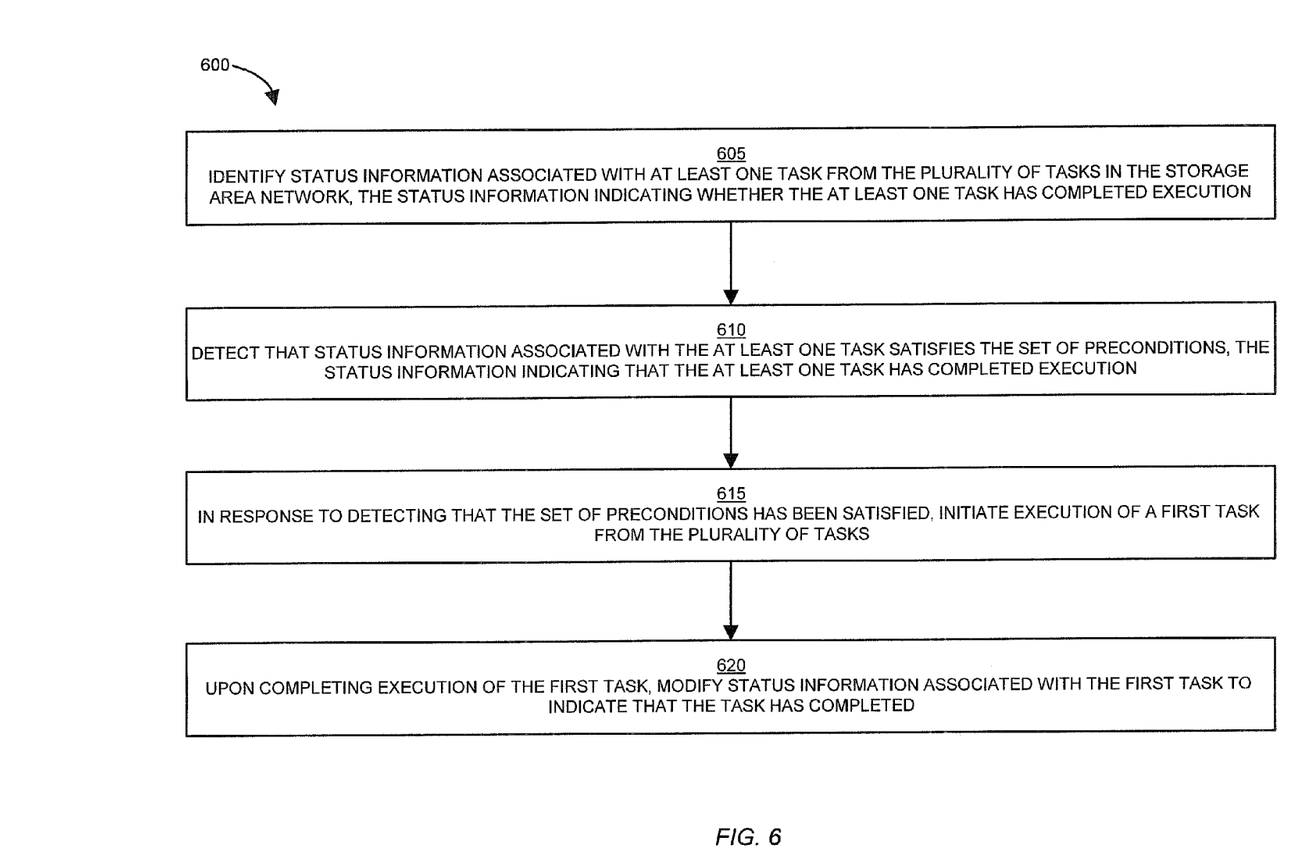

FIG. 6 is a detailed flowchart 600 illustrating task execution and task management according to embodiments herein. Note that techniques discussed in flowchart 600 overlap with the techniques discussed above in the previous figures.

In step 605, the task manager 150 identifies status information associated with at least one task from the plurality of tasks in the storage area network. In one example embodiment, the status information indicates whether at least one task has completed execution.

In step 610, the task buffer 170 detects that status information associated with the at least one task satisfies the set of preconditions.

In step 615, in response to detecting that the set of preconditions has been satisfied, the task buffer 170 initiates execution of a first task from the plurality of tasks.

In step 620, upon completing execution of the first task, the task buffer 170 (e.g., via status updater 178) modifies status information associated with the first task to indicate that the task has completed. Note that the task can also internally modify state upon recognizing that execution has completed.

According to one example embodiment, the task buffer 170 enables interruption of a first task from the plurality of tasks after execution of the first task has been initiated to provides for non-atomic execution of the first task in the storage area network. Upon interruption of the first task, the task buffer 170 modifies the status information associated with the first task to indicate that the first task has paused. In one embodiment, the status information is represented differently for when the first task is in a paused state and for when the first task has completed execution. At a time after the first task has been interrupted, the task buffer 170 then resumes execution of the first task and modifies the status information associated with the first task to indicate that the first task has resumed execution.

Figure 7:
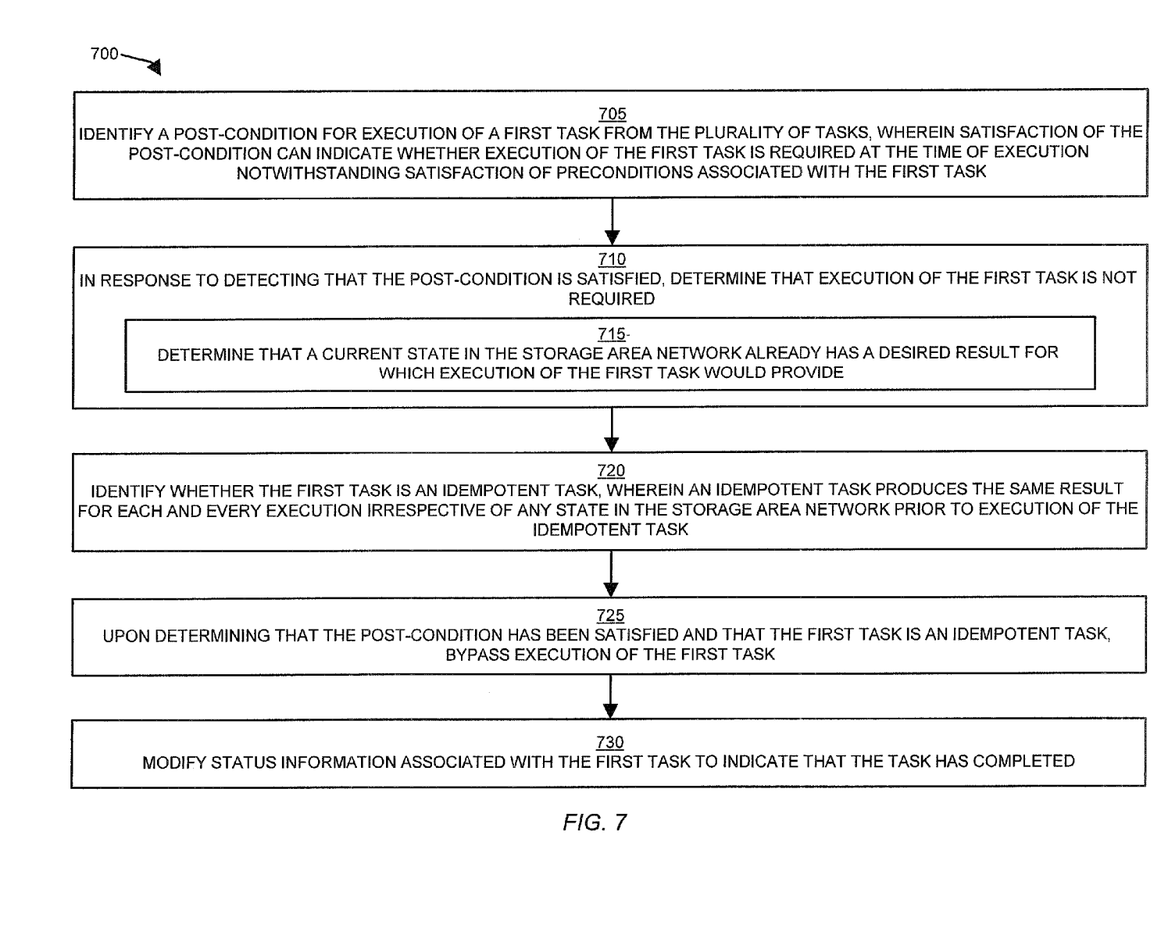

FIG. 7 is a detailed flowchart 700 illustrating task execution and task management according to embodiments herein. Note that techniques discussed in flowchart 700 overlap with the techniques discussed above in the previous figures.

In step 705, the task manager 150 identifies a post-condition for execution of a first task from the plurality of tasks. According to one example embodiment, satisfaction of the post-condition can indicate whether execution of the first task is required at the time of execution notwithstanding satisfaction of preconditions associated with the first task.

In step 710, in response to detecting that the post-condition is satisfied, the task buffer 170 determines that execution of the first task in not required.

In step 715, the task buffer 170 determines that a current state in the storage area network already has a desired result for which execution of the first task would provide.

In step 720, the task buffer 170 identifies whether the first task is an idempotent task that produces the same result for each and every execution irrespective of any state in the storage area network prior to execution of the idempotent task.

In step 725, upon determining that the post-condition has been satisfied and that the first task is an idempotent task, the task buffer 170 bypasses execution of the first task.

In step 730, the task buffer 170 modifies status information associated with the first task to indicate that the task has completed.

Figure 8:
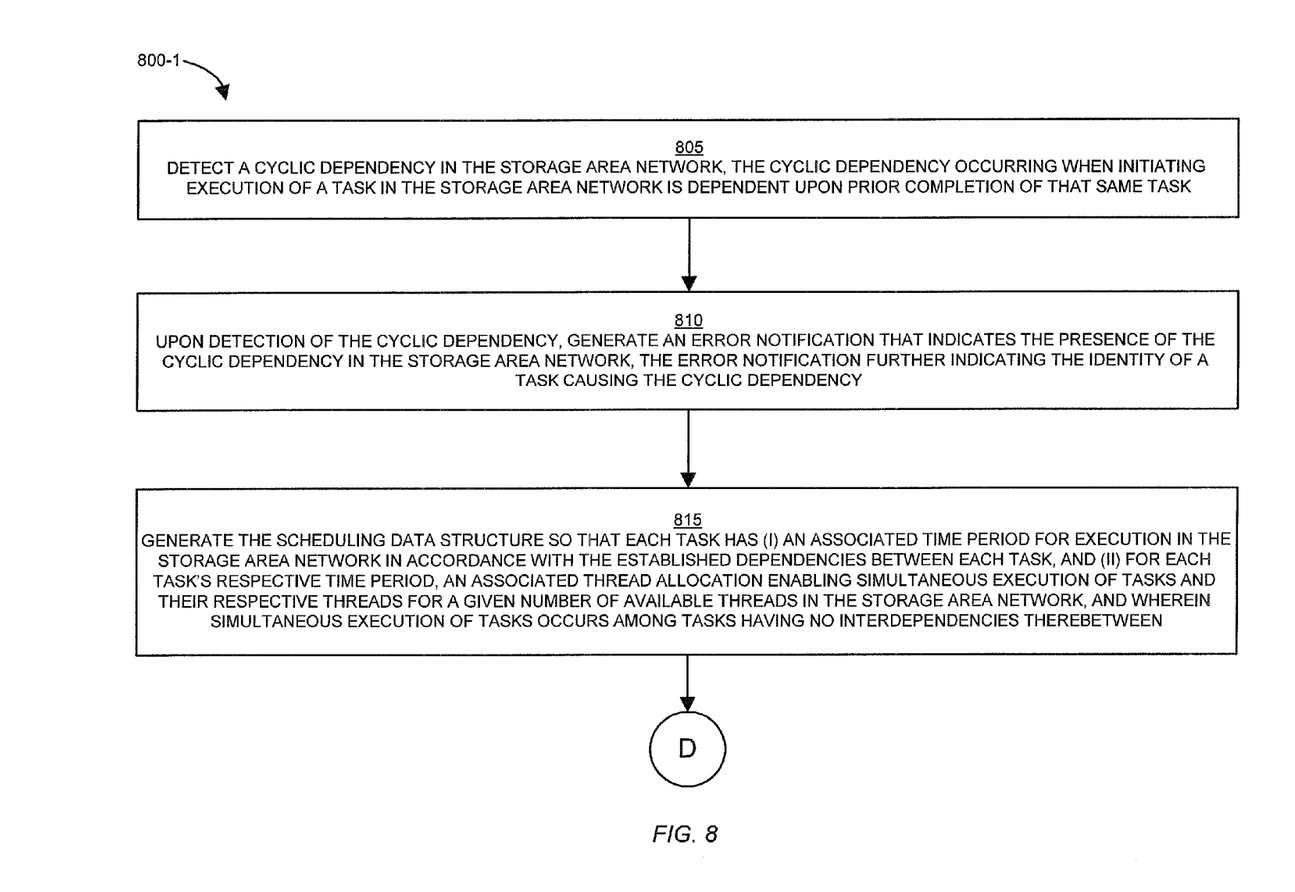
Figure 9:
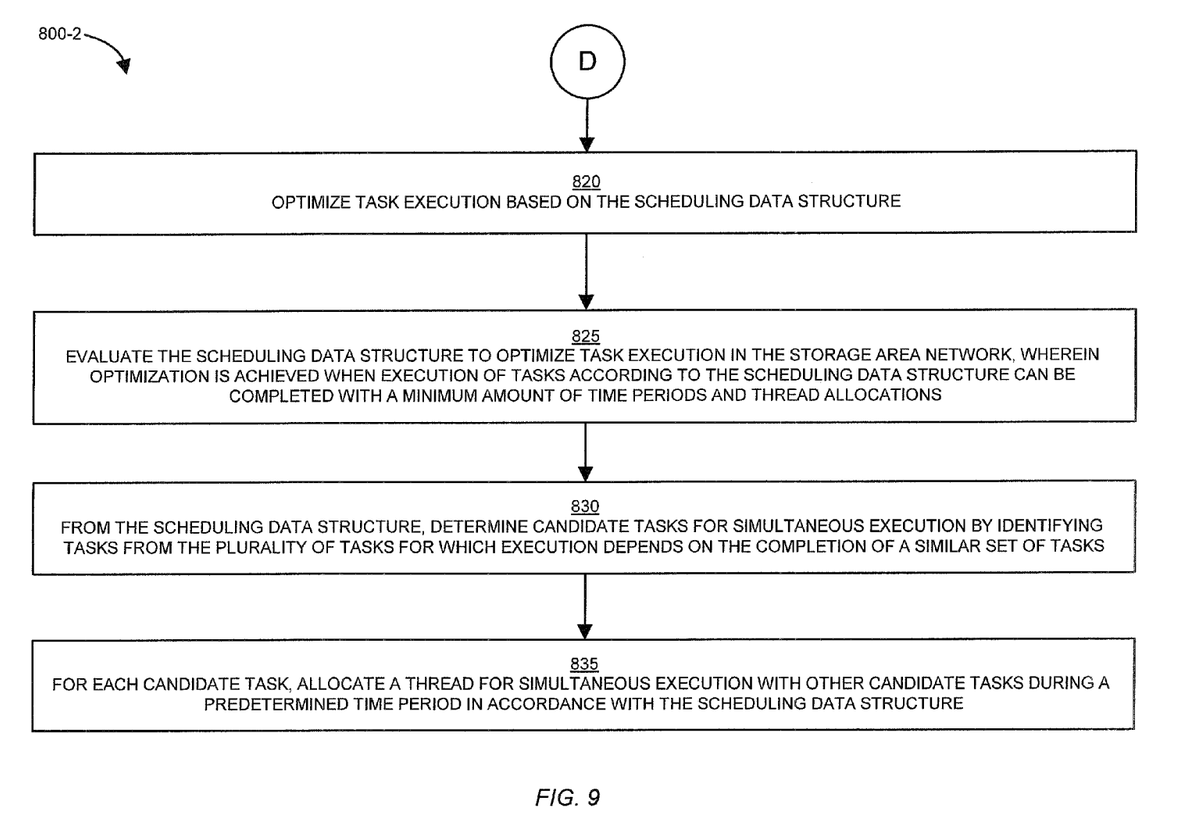

FIGS. 8 and 9 combine to form a detailed flowchart 800 (e.g., flowchart 800-1 and flowchart 800-2) illustrating task execution and task management according to embodiments herein. Note that techniques discussed in flowchart 800 overlap with the techniques discussed above in the previous figures.

In step 805, the task manager 150 detects a cyclic dependency in the storage area network. Generally, a cyclic dependency occurs when the execution of a task in the storage area network is dependent upon prior completion of that same task.

In step 810, upon detection of the cyclic dependency, the task manager 150 generates an error notification that indicates the presence of the cyclic dependency in the storage area network. In addition, the error notification can further indicate the identity of a task causing the cyclic dependency.

In step 815, the task manager 150 generates the scheduling data structure so that each task has (i) an associated time period for execution in the storage area network in accordance with the established dependencies between each task, and (ii) for each task's respective time period, an associated thread allocation enabling simultaneous execution of tasks and their respective threads for a given number of available threads in the storage area network. Accordingly, simultaneous execution of tasks occurs among tasks having no interdependencies therebetween.

In step 820, the task manager 150 optimizes task execution based on the scheduling data structure.

In step 825, the task manager 150 evaluates the scheduling data structure to optimize task execution in the storage area network. In one example embodiment, optimization is achieved when execution of tasks according to the scheduling data structure can be completed with a minimum amount of time periods and thread allocations.

In step 830, from the scheduling data structure, the task manager 150 determines candidate tasks for simultaneous execution by identifying tasks from the plurality of tasks for which execution depends on the completion of a similar set of tasks.

In step 835, for each candidate task, the task manager 150 allocates a thread for simultaneous execution with other candidate tasks during a predetermined time period in accordance with the scheduling data structure.

Composition of New Tasks

There is no need for a separate model that allows Tasks to be "composed" at run time. Task composition through the specification of rules is the very essence of the embodiments disclosed herein. For example, assume that Task_A has a property called 'foo' and Task_B has a property called 'bar'. Suppose that a user wants to "chain" A to B such that when A completes, the value of 'foo' is copied to the 'bar' property in B, and then B is executed. Implementation of this example is shown in the following pseudo-code:

```
TaskA a = new TaskA( );
a.foo = "goredsox"; // this would really happen inside    // task.execute
TaskB b = new TaskB( );
Rule r = new Rule( );
r.preconditions.add(new TaskCompletionCondition(a));
r.actions.add(new CopyProperty("a.foo", "b.bar"));
r.actions.add(b);
```

As previously discussed, a graphical user interface could enable an end user (e.g., network administrator) to perform each operation by drawing lines between Tasks and selecting different types of Conditions or Tasks.

Event Driven Task Execution

The rule-based task execution as described above may provide a straightforward path to event driven task execution. Submitting a task would cause the task manager 150 to subscribe to all of the preconditions listed in the associated Rule. As each condition becomes TRUE, the task manager 150 can check those conditions for changes in state. When all preconditions for a Rule become true, the task manager 150 calls Rule.evaluate( )—not Task.exeute( )—in order to run the associated Tasks.

Hide Rule and Condition Creation in Convenience Methods

The creation of Rules, preconditions, postconditions, and Tasks can be made much easier for the application developer by providing convenience methods in the Task class. Example convenience methods (a) through (d) provided by the framework are shown below:

(a) follows(Task t): Establishes the condition that the current task follows the Task t.
   TaskA a=new TaskA( );
   TaskB b=new TaskB( );
   b.follows(a);
(b) precedes(Task t): The current task precedes Task t.
   TaskA a=new TaskA( );
   TaskB b=new TaskB( );
   a.precedes(b);
(c) chain(PropertyRef from, PropertyRef to): Simplifies task chaining as described previously.

```
TaskA a = new TaskA( );
TaskB b = new TaskB( );
b.chain(a.foo, b.bar);    // a executes, then a CopyProperty
                          // Task copies the value of a.foo into
                          // b.bar, and then b is executed
b.chain(a.bas, b.xyz);    // adds another CopyProperty Task to the
                          // list of actions in the rule
``` d) List<Step> getExecutionOrder( ): Returns a list of Steps. A Step contains a number and a list of Tasks to be executed in that step.

As discussed above, techniques herein are well suited for use in an environment (e.g., storage area network environments) in which tasks are scheduled for execution in accordance with a dependency-based model. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method for executing a plurality of storage management tasks in a storage area network, wherein each task defines a unit of work that can be executed atomically to achieve a desired result in the storage area network, the method comprising:
   identifying a set of preconditions for execution of the plurality of tasks, the set of preconditions establishing dependencies between the plurality of tasks in the storage area network, wherein execution of the plurality of tasks is contingent upon satisfaction of the set of preconditions;

generating a scheduling data structure based on the set of preconditions in order to schedule execution of the plurality of tasks, further comprising generating the scheduling data structure so that each task has (i) an associated time period for execution in the storage area network in accordance with the established dependencies between each task, and (ii) for each task's respective time period, an associated thread allocation enabling simultaneous execution of tasks and their respective threads for a given number of available threads in the storage area network, and wherein simultaneous execution of tasks occurs among tasks having no interdependencies therebetween; and optimizing task execution based on the scheduling data structure, wherein optimizing task execution minimizes resource consumption in the storage area network during execution of the plurality of tasks.

2. A method as in claim 1 further comprising:

in response to detecting that the set of preconditions has been satisfied, initiating execution of a first task from the plurality of tasks; and upon completing execution of the first task, modifying status information associated with the first task to indicate that the task has completed.

3. A method as in claim 2, wherein detecting that the at least one precondition has been satisfied comprises:

identifying status information associated with at least one task from the plurality of tasks in the storage area network, the status information indicating whether the at least one task has completed execution; and detecting that status information associated with the at least one task satisfies the set of preconditions, the status information indicating that the at least one task has completed execution.

4. A method as in claim 1 further comprising:

enabling interruption of a first task from the plurality of tasks after execution of the first task has been initiated, wherein enabling interruption of the first task provides for non-atomic execution of the first task in the storage area network; and upon interruption of the first task, modifying the status information associated with the first task to indicate that the first task has paused, the status information represented differently for when the first task is in a paused state and for when the first task has completed execution.

5. A method as in claim 4 further comprising:

at a time after the first task has been interrupted, resuming execution of the first task; and upon resuming execution of the first task, modifying the status information associated with the first task to indicate that the first task has resumed execution.

6. A method as in claim 1 further comprising:

identifying a post-condition for execution of a first task from the plurality of tasks, wherein satisfaction of the post-condition can indicate whether execution of the first task is required at the time of execution notwithstanding satisfaction of preconditions associated with the first task.

7. A method as in claim 6 further comprising:

in response to detecting that the post-condition is satisfied, determining that execution of the first task is not required;

bypassing execution of the first task; and modifying status information associated with the first task to indicate that the task has completed.

8. A method as in claim 6, wherein determining that execution of the first task is not required comprises:

determining that a current state in the storage area network already has a desired result for which execution of the first task would provide.

9. A method as in claim 6 further comprising:

identifying whether the first task is an idempotent task, wherein an idempotent task produces the same result for each and every execution irrespective of any state in the storage area network prior to execution of the idempotent task;

upon determining that the post-condition has been satisfied and that the first task is an idempotent task, bypassing execution of the first task; and modifying status information associated with the first task to indicate that the task has completed.

10. A method as in claim 1 further comprising:

detecting a cyclic dependency in the storage area network, the cyclic dependency occurring when initiating execution of a task in the storage area network is dependent upon prior completion of that same task; and upon detection of the cyclic dependency, generating an error notification that indicates the presence of the cyclic dependency in the storage area network, the error notification further indicating the identity of a task causing the cyclic dependency.

11. A method as in claim 1 further comprising:

enabling generation of task dependencies in a graphical user interface, wherein tasks are represented as separate entities that occupy non-overlapping task regions in the graphical user interface, and wherein a precondition between two tasks is generated by graphically connecting the respective task regions with a unidirectional indicator.

12. A method as in claim 1 wherein optimizing task execution based on the scheduling data structure comprises:

evaluating the scheduling data structure to optimize task execution in the storage area network, wherein optimization is achieved when execution of tasks according to the scheduling data structure can be completed with a minimum amount of time periods and thread allocations.

13. A method as in claim 12 further comprising:

from the scheduling data structure, determining candidate tasks for simultaneous execution by identifying tasks from the plurality of tasks for which execution depends on the completion of a similar set of tasks; and for each candidate task, allocating a thread for simultaneous execution with other candidate tasks during a predetermined time period in accordance with the scheduling data structure.

14. A computer system in a storage area network comprising:

a processor;

a memory unit that stores instructions associated with a storage management application executed by the processor; and an interconnect coupling the processor and the memory unit, enabling the computer system to execute the storage management application and perform operations of:

identifying a set of preconditions for execution of a plurality of tasks, the set of preconditions establishing dependencies between the plurality of tasks in the storage area network, each task defining a series of user-defined commands which are executed atomically to achieve a desired result in the storage area network, wherein execution of the plurality of tasks is contingent upon satisfaction of the set of preconditions;

generating a scheduling data structure based on the set of preconditions in order to schedule execution of the plurality of tasks, further comprising generating the scheduling data structure so that each task has (i) an associated time period for execution in the storage area network in accordance with the established dependencies between each task, and (ii) for each task's respective time period, and associated thread allocation enabling simultaneous execution of tasks and their respective threads for a given number of available threads in the storage area no interdependencies therebetween; and optimizing task execution based on the scheduling data structure, wherein optimizing task execution minimizes resource consumption in the storage area network during execution of the plurality of tasks.

15. A computer system as in claim 14 further comprising:

evaluating the scheduling data structure to optimize task execution in the storage area network, wherein optimization is achieved when execution of tasks according to the scheduling data structure can be completed with a minimum amount of time periods and thread allocations;

from the scheduling data structure, determining candidate tasks for simultaneous execution by identifying tasks from the plurality of tasks for which execution depends on the completion of a same set of tasks; and for each candidate task, allocating a thread for simultaneous execution with other candidate tasks during a predetermined time period in accordance with the scheduling data structure.

16. A non-transitory computer-readable medium having instructions stored thereon, the instructions, when executed by a processing device in a storage area network, enabling the processing device to perform storage management operations of:

identifying a set of preconditions for execution of a plurality of tasks, the set of preconditions establishing dependencies between the plurality of tasks in the storage area network, each task defining a series of user-defined commands which are executed atomically to achieve a desired result in the storage area network, wherein execution of the plurality of tasks is contingent upon satisfaction of the set of preconditions;

generating a scheduling data structure based on the set of preconditions in order to schedule execution of the plurality of tasks, further comprising generating the scheduling data structure so that each has (i) an associated time period for execution in the storage area network in accordance with the established dependencies between each task, and (ii) for each task's respective time period, an associated thread allocation enabling simultaneous execution of tasks and their respective threads for a given number of available threads in the storage area network, and wherein simultaneous execution of tasks occurs among tasks having no interdependencies therebetween; and applying a task optimization algorithm to the scheduling data structure, wherein application of the task optimization algorithm minimizes resource consumption in the storage area network during execution of the plurality of tasks, wherein optimizing task execution based on the scheduling data structure comprises:

evaluating the scheduling data structure to optimize task execution in the storage area network, wherein optimization is achieved when execution of tasks according to the scheduling data structure can be completed with a minimum amount of time periods and thread allocations.

17. A non-transitory computer-readable medium as in claim 16 further comprising:

enabling generation of task dependencies in a graphical user interface, wherein tasks are represented as separate entities that occupy non-overlapping task regions in the graphical user interface, and wherein a precondition between two tasks is generated by graphically connecting the respective task regions with a unidirectional indicator.

* * * * *